United States Patent Office 3,174,996
Patented Mar. 23, 1965

3,174,996
PREPARATION OF ESTERS
Eric R. Larsen, Midland, Mich., assignor to The Dow Chemical Company, Midland, Mich., a corporation of Delaware
No Drawing. Filed Aug. 27, 1962, Ser. No. 219,762
5 Claims. (Cl. 260—487)

This invention relates to a new method for the preparation of particular aliphatic esters of and it relates particularly to a new method whereby these esters are produced by the acid-catalyzed hydrolysis of certain fluorine-containing aliphatic ethers.

These ethers are 1,1-difluorinated aliphatic ethers of the formula

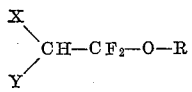

wherein R is primary lower alkyl and X and Y are selected from the group consisting of halogen, alkyl of about 1–6 carbon atoms, and halogenated alkyl of about 1–6 carbon atoms. Such compounds are conveniently prepared by the reaction of an alkanol with a suitable polyhalo α-olefin, preferably a perhalo-α-olefin, in the presence of an alkali metal or basic alkali metal salt as catalyst. Preparations employing this method are described in detail by Hanford and Rigby in U.S. 2,409,274.

By primary lower alkyl is meant such groups as methyl, ethyl, propyl, butyl, and isobutyl and by halogen is meant any of the halogens, fluorine, chlorine, bromine, and iodine.

It is known that ethers having the above structure are attacked by strong acids such as sulfuric and phosphoric acids and that the α-CF$_2$-group is thereby hydrolyzed to a carbonyl group, producing the corresponding ester, the acid, or a mixture of the two. Large proportions of acid have been used and it has been found necessary to run the reaction at ice temperature or thereabouts to avoid excessive formation of by-products. Even so, yields reported from these reactions are often low and the esters produced have been contaminated with difficultly separable by-products. Such reactions are reported by Young and Tarrant, J. Am. Chem. Soc. 71, 2432, and other workers in the area.

It has now been found that uniformly high yields of esters may be obtained when the ethers described are reacted with silica gel or other siliceous materials in the presence of a catalytic amount of a strong mineral acid. Side reactions are avoided by thus holding the acid concentration at a low level and the esters thereby obtained are essentially free of bothersome by-products. The ester products, which have the structure

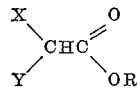

wherein R, X, and Y are as previously defined, are useful largely as chemical intermediates and as solvents for chemical reactions and it is particularly advantageous, therefore, to be able to prepare these compounds in pure form. This method is particularly valuable for the preparation of dihaloacetates containing two different halogens, esters which are often not easily obtainable by conventional procedures.

The reaction apparently takes place according to the equation

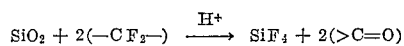

and accordingly it is necessary to employ at least the stoichiometric amount of one mole of silica to two moles of ether. Silica in any form which will react with HF is suitable, including dried silica gel, silica sand, powdered quartz, and the like. Other similarly reactive oxygen-containing silicon compounds such as silicic acid, metal silicates and the like, including glass, preferably finely divided, are equivalent for the purpose and are included by the term siliceous materials.

Acid catalysts for the reaction comprise the strong mineral acids such as sulfuric acid, chlorosulfonic acid, phosphoric acid, hydrochloric acid, hydrofluoric acid, fluosilicic acid, and the like. Sulfuric acid gives excellent results and is a preferred catalyst. Only a catalytic quantity of acid is required to initiate the reaction, for example, a quantity of the order of 0.00001 mole per mole of ether to be reacted is sufficient. Up to about 0.1 mole of acid may be used but smaller quantities are preferred for best results, for example, from 0.001 to about 0.05 mole per mole of ether.

Operable temperatures for the hydrolysis range from about 50° C. to about 200° C. The reflux temperature of the reaction mixture is usually convenient and easily maintained. Ordinarily the reaction is run under atmospheric pressure although pressures somewhat above or below this level may be employed.

The reaction is best carried out simply by combining the reactants as described and heating in the above temperature range until a large part or all of the ether has been hydrolyzed, then separating the ester product from the reaction mixture, for example, by solvent extraction or by distillation. Stirring or other agitation of the reaction mixture may facilitate the progress of the reaction but is usually not necessary. The crude ester thus obtained may then be purified further by suitable means and this is done conveniently in most cases by fractional distillation. The time of reaction is usually several hours and depends on the nature of the reactants used and the reaction temperature. Glass or silica reaction equipment may be employed although these are attacked to some extent during the reaction and it may be preferred to use equipment fabricated of a material more resistant to hydrogen fluoride.

The following examples illustrate the practice of the invention.

*Example 1*

A 500 ml. reaction flask equipped with thermometer and reflux condenser was charged with 142 g. (2.2 g. moles) of dry granular silica gel and 342 g. (2.06 g. moles) of CH$_3$—O—CF$_2$CHCl$_2$. This mixture was heated to about 100° C. and 1.8 g. of 96% sulfuric acid was added. An exothermic reaction began immediately with evolution of SiF$_4$. Heating at about reflux temperature was continued for 8 hours, at which time the temperature of the reaction mixture had reached 142° C. The crude product was distilled from the reaction flask by heating under reduced pressure until no more distillate could be obtained. Infrared examination of this material revealed no evidence of undesirable side reactions. The distillate was redistilled to yield 268 g. of pure methyl dichloroacetate.

*Example 2*

As described in Example 1, a mixture of 200 g. of CH$_3$—O—CF$_2$CHBrF, 80 g. of silica gel, and 1 ml. of concentrated sulfuric acid was heated to reflux temperature and maintained under reflux until the pot temperature had reached 133° C., a heating period of about 5 hours. The crude methyl bromofluoroacetate was washed out of the silica gel remaining with ethyl ether and the extracted gel was then heated under reduced pressure until no further weight loss occurred. The distillate thereby obtained was combined with the ether extract and the whole was distilled to yield 19 g. of unreacted 2-bromo-1,1,2-trifluoroethyl methyl ether and 138 g. of purified methyl bromofluoroacetate. This represents an 81% conversion of halogenated ether and a yield of ester of 90% based on the conversion.

Hydrolysis of the above ether by the method of Young and Tarrant, J. Am. Chem. Soc. 71, 2432, wherein the ether was heated with an approximately equal volume of concentrated sulfuric acid, resulted in a yield of crude ester of 61%, the yield of pure ester obtainable from this crude product being somewhat lower.

Example 3

A mixture of 138 g. of $CH_3$—O—$CF_2CHClF$, 157 g. powdered glass, and 2 ml. of 95% $H_2SO_4$ was heated at 80–83° C. for 7.5 hours and then was allowed to stand at room temperature overnight. The crude methyl chlorofluoroacetate was distilled from the reaction flask under reduced pressure. Redistillation of the crude product through a packed column yielded 20 g. of unreacted ether and 86 g. of purified methyl chlorofluoroacetate, together with 7.0 g. of a mixed cut containing 42 mole percent of ester. The distillation residue amounted to 3 g. and consisted largely of ester.

By the procedure described and illustrated above, other lower primary alkyl alkanoates are prepared in similar yields from the corresponding fluorinated ethers. Thus, by hydrolysis of 1,1,3,3,3-pentafluoro-2-(trifluoromethyl) propyl methyl ether by this method, there is obtained methyl 3,3,3-trifluoro-2-(trifluoromethyl)propionate, from 1,1,2,2,-tetrafluoroethyl butyl ether there is obtained butyl difluoroacetate, from methyl 1,1,2,3,3,4,4,5,5,6,6,7,7,7-tetradecafluoroheptyl ether there is obtained methyl 2,3,3,4,4,5,5,6,6,7,7,7-dodecafluoroheptanoate and from ethyl 1,1,2,3,3,3-hexafluoropropyl ether there is obtained ethyl 2,3,3,3-tetrafluoropropionate.

I claim:

1. A method for making an aliphatic ester of the formula

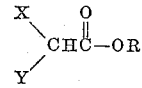

which comprises reacting by contacting one mole of an ether of the formula

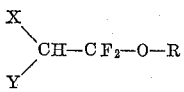

where in each of the above formulas R is lower primary alkyl and X and Y are selected from the group consisting of halogen, and halogenated alkyl of one to about six carbon atoms, with at least about one half molar equivalent of silica as contained in a siliceous material in the presence of a small but catalytic amount of a strong mineral acid at about 50° to about 200° C.

2. The method of claim 1 wherein the mineral acid is sulfuric acid.

3. The method of claim 1 wherein the siliceous material is silica gel.

4. The method of claim 1 wherein X and Y are halogen atoms of different atomic number.

5. The method of claim 1 wherein the siliceous material is a silicate glass.

References Cited by the Examiner

Young, J.A.C.S., vol. 71, pp. 2432–33 (1949).

LEON ZITVER, *Primary Examiner.*